United States Patent [19]

Hirasaka et al.

[11] Patent Number: 5,194,462

[45] Date of Patent: Mar. 16, 1993

[54] FIBER REINFORCED PLASTIC SHEET AND PRODUCING THE SAME

[75] Inventors: Masato Hirasaka; Yoshiaki Fujiwara, both of Tokyo, Japan

[73] Assignee: Nkk Corporation, Tokyo, Japan

[21] Appl. No.: 822,008

[22] Filed: Jan. 17, 1992

Related U.S. Application Data

[62] Division of Ser. No. 515,383, Apr. 27, 1990, Pat. No. 5,108,678.

[30] Foreign Application Priority Data

Apr. 27, 1989 [JP] Japan .................................. 1-105798
Mar. 27, 1990 [JP] Japan .................................. 2-75454

[51] Int. Cl.$^5$ .............................. C08J 5/04; D04H 1/42; C08K 7/04
[52] U.S. Cl. ........................................ 524/13; 524/14; 524/34; 524/35; 524/434; 524/435; 524/436; 524/437; 524/492; 524/493; 524/494; 524/495; 524/496; 428/298; 428/301; 428/302

[58] Field of Search ........................ 524/13, 14, 34, 35, 524/434, 435, 436, 437, 492, 493, 494, 495, 496; 428/298, 301, 302

[56] References Cited

U.S. PATENT DOCUMENTS

| | | | |
|---|---|---|---|
| 1,888,410 | 11/1932 | Schacht | 428/301 |
| 2,765,247 | 10/1956 | Graham | 428/301 |
| 3,936,555 | 2/1976 | Smith, II | 428/301 |
| 3,952,124 | 4/1976 | Mesek | 428/302 |
| 4,529,644 | 7/1985 | Awano et al. | 428/301 |

Primary Examiner—Nathan M. Nutter
Attorney, Agent, or Firm—Sughrue, Mion, Zinn, Macpeak & Seas

[57] ABSTRACT

This invention relates to a fiber reinforced plastic sheet having a gradient layer structure wherein the number of reinforcing fibers continuously varies. The fiber reinforced plastic sheet of the invention is excellent in smooth appearance, fluidity during molding to an article, fiber filling ability into a complex form portion of an article and mechanical strength and can be produced inexpensively.

5 Claims, 5 Drawing Sheets

FIG. 9
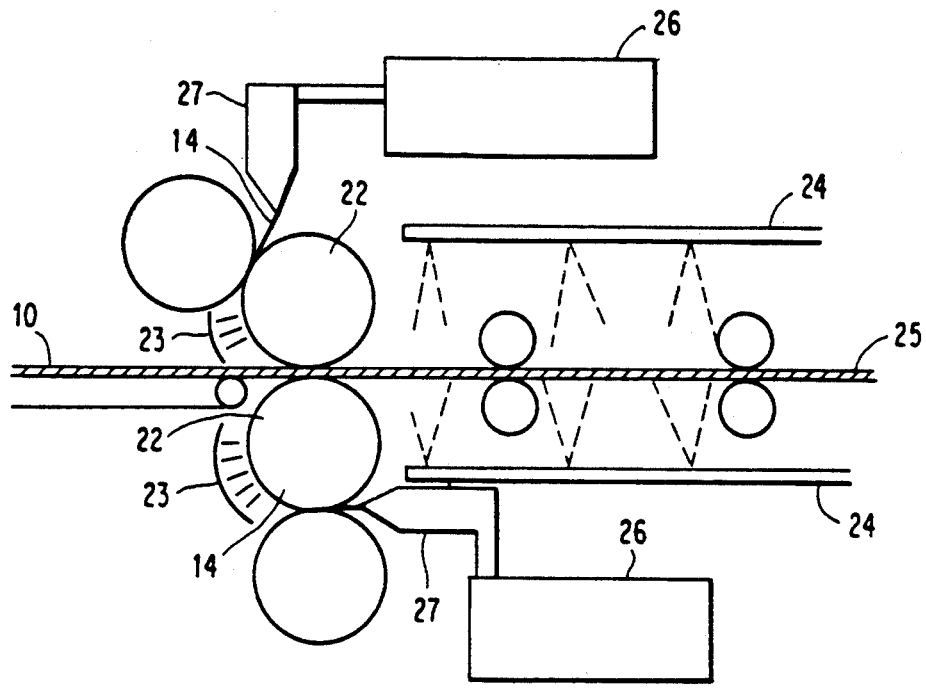
FIG. 10
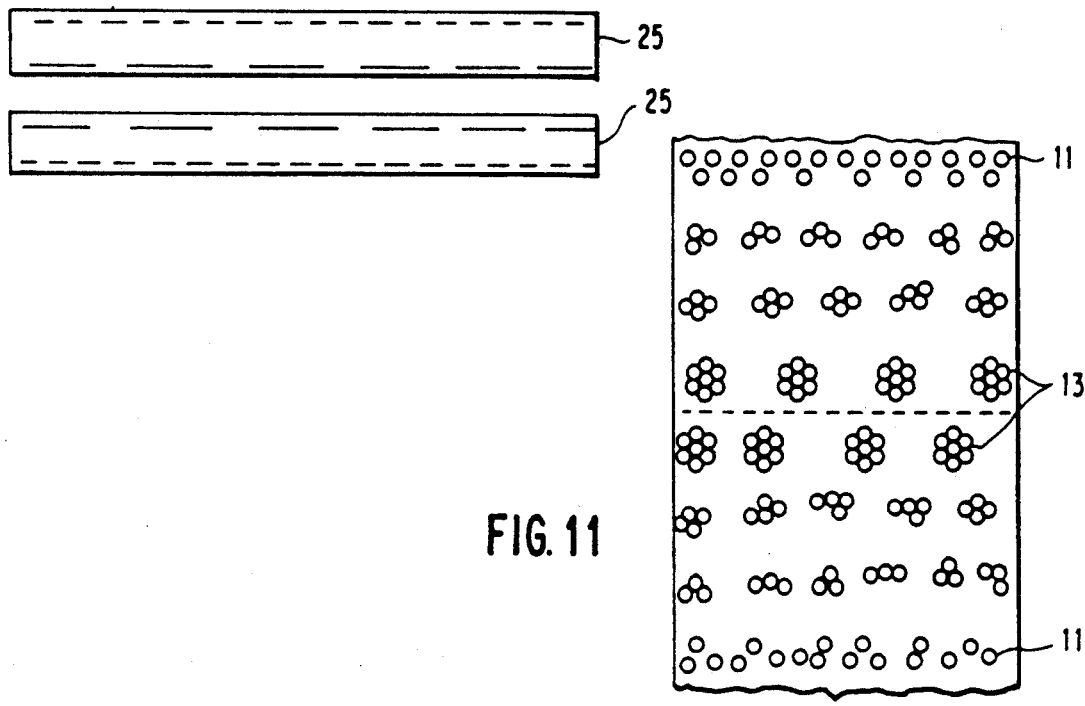
FIG. 11

FIBER REINFORCED PLASTIC SHEET AND PRODUCING THE SAME

This is a division of application Ser. No. 515,383, filed Apr. 27, 1990 and now U.S. Pat. No. 5,108,678.

BACKGROUND OF THE INVENTION

1. Field of the Invention

This invention relates to a fiber reinforced plastic sheet having a gradient layer structure wherein the number of reinforcing fibers continuously varies, and a process for producing the same.

2. Description of the Prior Art

Heretofore, various plastic sheets composed of thermoplastic resins and reinforcing fibers have been developed. They can be divided into the following groups. One group is produced by mixing reinforcing fibers such as glass fibers with a thermoplastic resin in a melted state by a screw extruder, and extruding the blend in a sheet form through a T die. Another group involves a laminate of a mat of continuous fibers such as glass fibers and a fiber sheet (Japanese Patent KOKOKU No. 54-36193). A further group is a laminate of a chopped strand mat of a surfacing mat of discontinuous fibers and a resin sheet (Japanese Patent KOKOKU No. 51-14557). Another group is produced by mixing chopped strands such as glass fibers, with a resin powder with water in a slurry, then dehydrating, drying, and pressing under heating to form a sheet (Japanese Patent KOKAI No. 60-158228). Yet another group is produced by opening and mixing chopped strands with a resin powder in a gaseous phase, and pressing under heating the cotton-shaped mixture to form a sheet (Japanese Patent KOKOKU No. 64-6227, Japanese Patent KOKAI No. 59-49929). Finally another group is produced by mixing a resin powder with unopened chopped strands, and pressing under heating to form a sheet (Japanese Patent KOKOKU No. 51-20550).

However, in the first method using an extruder, since most of the reinforcing fibers are cut to less than 1 mm in length by the screw of the extruder, the reinforcing effect of the thermoplastic resin, particularly impact strength, is insufficient. The second method of laminating a mat of continuous fibers is a most common method. In this method, since the fibers are continuous, the fluidity of the fibers is insufficient through its molding process such as compression molding using a mold into an arbitrary form under heating. Therefore, when a complex form such as a rib is molded, the filled amount of the fibers in the rib is low. The third method of laminating a chopped strand mat or surfacing mat of discontinuous fibers is expensive because of using the mat as a raw material for the sheet. Moreover, the fluidity of the fibers is inferior through its forming process into a sheet, because of binding the fibers by coating a binder thereto in order to keep the mat form of the chopped strand mat or the surfacing mat. In the method of mixing chopped strands with a resin powder with water in a slurry, the chopped strands are opened in water into monofilaments. Therefore, discontinuous monofilaments of about 7 to 50 mm in length are uniformly dispersed in the plastic sheet, and, as a result, the molded articles of the sheet formed into arbitrary forms are excellent in appearance. Moreover, this method is excellent from the viewpoint that the fibers are filled in complex form portions. However, since monofilaments are entangled with each other in the sheet, during molding a great flow resistance occurs to flow of the fibers into an arbitrary form together with a resin. As a result, great pressure is necessary for the molding. Moreover, short shot occasionally occurs because of the problem of resin fluidity. Another problem of this method of mixing chopped strands in water is low impact strength, due to the monofilaments. In view of its manufacturing process, the manufacturing cost is increased by the dehydration process of a great quantity of water and the drying process. In the method of opening chopped strands in a gaseous phase, discontinuous fibers and a resin powder are used similarly to the above method, but it is different in the mixing process which is carried out in a gaseous phase. Therefore, the dehydration process and the drying process do not necessarily result in decreasing the number of process steps. However, since opened strands are dispersed in a plastic resin, the plastic sheet has similar defects to the plastic sheet of the above method, i.e., great flow resistance, great molding pressure, small impact strength, etc. Besides, opened monofilaments are pill shaped, and the monofilaments are oriented at random in three-dimensions in the mixture of the resin powder and the fibers. Therefore, when a sheet formed of the mixture is heated at a temperature higher than the melting point of the resin during molding, the sheet expands due to springback of the fibers, and some fibers are projected from the surface of the sheet to degrade the appearance. In the last method of mixing a resin powder with unopened chopped strands, since unopened-strands are present around the surface of the sheet, the appearance of the molded article is inferior.

SUMMARY OF THE INVENTION

An object of the invention is to solve the above problems in the prior art collectively and to provide a fiber reinforced plastic sheet excellent in appearance, mechanical properties such as impact strength and fluidity, and which at molding is capable of filling fibers into complex form portions, and which is inexpensive.

The present invention provides a fiber reinforced plastic sheet and a process therefor which have achieved the above object. The fiber reinforced plastic sheet comprises discontinuous reinforcing fibers different in the number of filaments dispersed in a thermoplastic or thermosetting resin, said fibers being arranged in a gradient layer structure varying from a layer of the fiber having a greater number of filaments to a layer of the fiber having a lesser number of filaments continuously. The process for producing a fiber reinforced plastic sheet comprises separating discontinuous reinforcing fibers which are being opened or have been opened to form a distribution of the fibers different in the number of filaments by spreading them over the traveling zone of a conveyor at an angle except the vertical direction toward the traveling zone together with airflow to form a gradient layer utilizing the difference in the weight of each fiber, superposing or interposing a resin on or in said gradient layer, and pressing the superposed on interposed material under heating to form the fiber reinforced plastic sheet.

BRIEF DESCRIPTION OF THE DRAWINGS

FIG. 9 is a schematic side view of an apparatus producing a fiber reinforced plastic sheet of the invention by impregnating a melted resin into a fiber nonwoven fabric by pressing under heating followed by cooling.

FIG. 10 is a schematic section of two fiber reinforced plastic sheets facing each other, and FIG. 11 is an enlarged schematic section after they are joined.

DETAILED DESCRIPTION OF THE INVENTION

Figure 1:
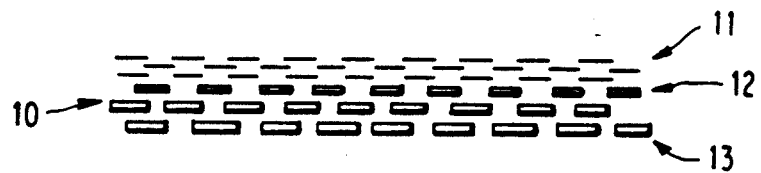
FIG. 1 is a schematic section of a fiber nonwoven facric used for a fiber reinforced plastic sheet of the invention.

The fibers used as a raw material are discontinuous strands called chopped strands, and a strand is an aggregate of hundreds to thousands of single fibers. A suitable length of the strands is usually about 3 to 50 mm. When continuous strands are used, they are cut into the above length. The kind of the fiber necessarily has heat resistance capable of resisting the process of pressing the superposed material under heating, and is selected according to the use of the fiber reinforced plastic sheet or the like. Examples of the fiber are synthetic fibers such as glass fiber, carbon fiber, metal fiber, asbestos and aramid fiber, pulp, cotton, and the like.

A gradient layer varying from a layer of the fiber having a greater number of filaments to a layer of the fiber having a lesser number of filaments continuously can be produced as follows. First, strands cut to a prescribed length (chopped strands) are prepared. The chopped strahds are used as a raw material as they are, or opened to a certain degree to form a distribution from strands themselves, or suitably opened to considerably opened, up to monofilaments. The degree of opening is selected according the required properties of the fiber reinforced plastic sheet, but it is important that more than 30 wt. % and preferably 50 wt. %, of the fiber is not monofilaments. A suitable amount of monofilaments is 1 to 70 wt. %, and preferably 5 to 50 wt. %. When the fibers have a suitable distribution in the number of filaments, the fibers may be supplied to the separation process. However, when the fibers are unopened or insufficiently opened, they are further opened in the separation process by using a rotary drum having spikes or the like until a part of the fibers are opened up to monofilaments.

Subsequently, a fiber nonwoven fabric is formed using the above opened chopped strands. This process is the most important for the invention. The opened chopped strands are delivered from a slit having a prescribed breadth with air, or preferably delivered by the centrifugal force of a rotary drum having spikes. The opened chopped strands thrown into the air fall to layer form on the traveling zone, such as a belt of a conveyor disposed thereunder. The throwing angle to the zone is not 90 degrees (vertical), and 10 to 80 degrees are preferred. The thickness and weight per unit area of the layer can be controlled by changing the traveling speed of the conveyor, delivery rate of the opened chopped strands, or the like. The fiber nonwoven fabrics thus formed may be superposed to form a multilayer.

A resin powder may be distributed by spraying from the upside of the traveling zone between the position to begin piling the opened chopped strands and the position to finish piling them. When a necessary amount of the resin is distributed, the next process of superposing a resin may be omitted.

The traveling zone of the conveyor is preferably of the air-passing type, such as a mesh conveyor or a SUNOKO conveyor (the traveling zone is formed of a drainboard or hurdle), so as to pile the opened chopped strands uniformly. When the traveling zone of the conveyor is not an air-passing type, the opened chopped strands are occasionally disturbed in the traveling zone such that a uniform layer does not result.

Subsequently, a resin is superposed on the fiber nonwoven fabric. As the superposing method, resin powder or resin pellets may be spread uniformly on both sides of the nonwoven fabric, or, preferably, resin sheets or a sheet-shaped melted resin are superposed on both sides of the nonwoven fabric. Then, the superposed material is pressed under heating to integrate the same. The heating temperature is necessarily higher than the melting point or the softening point. The kind of the resin is selected according to use of the fiber reinforced plastic sheet or the like, and includes various thermoplastic resins such as polyethylene resin, polypropylene resin, ethylene-propylene copolymer resin, ethylene-vinyl acetate copolymer resin, ethylene-acrylate ester copolymer resin, polyethylene terephthalate resin, polystyrene resin, polyvinyl chloride resin, polyvinylidene chloride resin, polycarbonate resin, polyamide resin, polyacetal resin, methacrylic resin, and blend resins containing them, and various thermosetting resins such as phenol resin, melamine resin, and urea resin.

A suitable ratio of the resin to the fiber is 100 parts by weight of the resin to 1 to 400 parts, and preferably 5 to 200 parts by weight of the fiber.

The thickness of the sheet is usually 1 to 10 mm. The sheet may also be used as a wall material, flooring material, stampable sheet, or the like, in an arbitary form, as well as molded articles.

In the manufacturing process, the opened chopped strands are thrown at an arbitrary angle, except the vertical direction. Heavier fibers, i.e., less opened strands, drop a shorter distance, and lighter fibers, i.e., more opened strands, drop a longer distance. Therefore, the dropped position of each fiber varies continuously according to its weight due to the opened degree of the strand. Since the traveling zone of the conveyor always travels in one direction, the thrown fibers are arranged in a gradient layer structure where less opened strands are disposed on the lower side and more opened strands are disposed on the upper side. The gradient layer material is a nonwoven fabric having a weak binding force caused by the entanglement of the fibers. Therefore, it can be used without binder coating or needle-punching treatment.

In the sheet of the invention, monofilaments or sufficiently opened fibers are disposed around the surface of the sheet, and they are arranged in parallel to the surface. The arrangement in parallel to the surface of the sheet means that most of the fibers are regularly layered during forming the nonwoven fabric, and fibers arranged in the vertical direction, i.e. the thickness direction of the nonwoven fabric, are rare. Therefore, not opened or less opened strands are not exposed on the surface of molded articles. Moreover, since the fibers are arranged two dimensionally in parallel to the surface, the fibers do not project from the surface due to springback in the thickness direction of the sheet during heating prior to the molding. Since opened fibers are uniformly dispersed in the directions parallel to the surface, the sheet is excellent in smoothness compared with the aforementioned conventional sheet containing pills.

As to the material fluidity in the molding process, it is decided by the fluidity properties of the resin, such as melt viscosity, and the form of the fiber, such as fiber length and the opened degree. When the sheet of the invention is compared with the aforementioned conventional sheets in the case of using the same resin, in the sheet of the invention, since not opened or less opened chopped strands are disposed on the inside, the flow resistance of melted resin is small compared with the conventional sheets, wherein most of the fibers are monofilaments. Furthermore, since no binder is used for keeping the form of nonwoven fabric in the sheet of the invention, the fibers can move together.

As to the fiber filling property into complex form portions, in the sheet of the invention, since discontinuous fibers having a length of 3 to 50 mm are used, entanglement of the fiber is less than the conventional sheets using a continuous fiber mat. Therefore, fibers move together with the resin, and the fibers are filled into complex form portions such as ribs. The filling property is also superior to the conventional sheet using a binder.

As to mechanical properties in the sheet of the invention, the fibers used for reinforcing have a length of 3 to 50 mm, and the fiber length is almost the same during producing the sheet. That is, the aspect ratio of fiber length to fiber diameter is kept high. Therefore, the sheet of the invention is excellent in mechanical strength, particularly impact strength, compared with the conventional sheet produced using an extruder. With respect to impact strength, it is empirically known that the impact strength using unopened chopped strands is higher than that of using monofilaments ("PLASTICS", vol. 17, No. 19, p 10). This is considered to be due to the difference in the propagation of impact energy and the absorption mechanism. In the sheet of the invention, though the fibers near the surface of the sheet are opened, unopened strands remain on the inside. Thus, the impact strength of the sheet of the invention is higher than the conventional sheets of opened strand type, due to the above structure. Besides, in the conventional sheets using unopened strands alone as the reinforcing material, the contact area of the resin with the fibers is small, and it is known that the reinforcing effects, particularly bending properties such as bending strength and bending elastic modulus, are inferior whereas, in the case of the sheet of the invention, since opened strands are disposed around the surface effective for bending properties, it has a sufficient bending strength.

The sheet of the invention can be produced inexpensively because of using a cheap commercial product of chopped strands as a raw material, compared with the conventional sheets using an expensive fiber nonwoven fabric mat. The dehydration process and the drying process are not necessary, and the manufacturing process is simple, to thereby decrease manufacturing costs.

EXAMPLES

Example 1

Chopped strands ("FES-13-1252M", manufactured by Fuji Fiber Glass Co., Ltd.) having a fiber length of 13 mm, a fiber diameter of 11 $\mu$m and filament number of 800 were put into a Henschel mixer ("FM 75J", manufactured Mitsui Miike Machinery Co., Ltd.), and stirred at a rotation speed of the ZoSo blade thereof of about 40 m/min in peripheral speed for 3 minutes. The glass fiber taken out of the mixer was composed of about 5 wt. % of monofilament and about 50 wt. % of unopened strand, and the remainder was in intermediate opened states.

Figure 2:
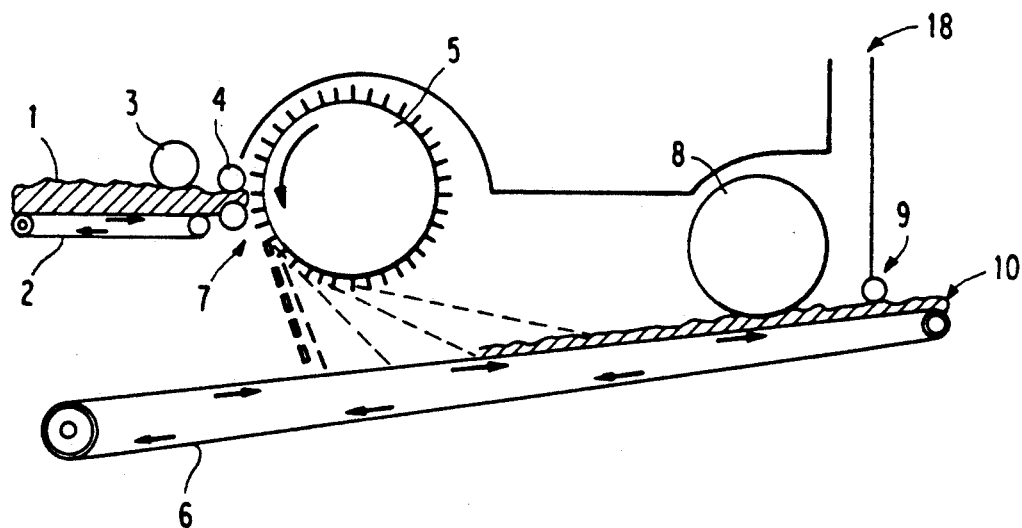
FIG. 2 is a schematic side view of an apparatus producing the above fiber nonowoven fabric.

A glass fiber nonwoven fabric shown in FIG. 1 was prepared from the above glass fiber using a single type drafts making machine (Chuo Menki Seisakusho) shown in FIG. 2. The glass fiber 1 was put on a SUNOKO conveyor 2 (the traveling zone was made of bamboo in a form of a drainboard or hurdle) uniformly, and fed to a spike drum 5 rotating quantitatively at 600 rpm through a wooden pressure roll 3 and a steel feeding roll 4. The diameter of the spike drum 5 was 513 mm$\phi$, and a cloth having needle projections called taken-in card clothing was wound around the surface. The glass fibers were further opened by the needle projections and thrown downward by the centrifugal force of the drum 5 toward a conveyor of bamboo SUNOKO 6 traveling in the arrow direction. Unopened strands fell near just under the discharged portion 7, and fibers in intermediate opened states fell more to the right side in the Figure according to the opened degree. Monofilaments and sufficiently opened ones fell at the most right side. Thus, the glass fibers were layered arranged according to the opened degree, and entangled each other therein. The surface of the layer was lightly regulated by a stainless steel casing roll (mesh roll) 8, and pressed by a steel roll 9 to go out as a glass fiber nonwoven fabric 10. Air was sucked through a duct 18 located after the casing roll 8.

The structure of the glass fiber nonwoven fabric 10 thus formed is shown in FIG. 1 schematically. The fibers opened up to monofilaments 11 were layered on the upper side of the nonwoven fabric 10, and the unopened strands 13 were layered on the lower side. The fibers in intermediate opened states 12 were arranged according to the opened degree therebetween to form a continuous variation layer. The nonwoven fabric shown in FIG. 1 was not three layer structure but a gradient layer structure continuously varying the number of filaments.

The traveling speed of both SUNOKO conveyors 2 and 6 can be set arbitarily, and they were driven at 50 cm/min for the conveyor 2 and at 100 cm/min for the conveyor 6. The areal weight of the nonwoven fabric 10 was about 500 g/m$^2$.

Figure 3:
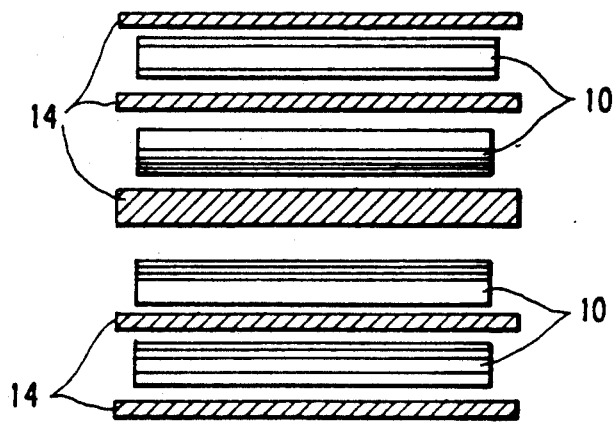
FIG. 3 is a schematic section illustrating a superposed state prior to pressing under heating to produce a fiber reinforced plastic sheet of the invention.

Four sheets of the nonwoven fabric 10 and five sheets of polypropylene (PP) film (MI=10, manufactured by Mitsui Petrochemical Industries Co., Ltd. were superposed alternately as shown in FIG. 3. The superposed material was preheated by a hot press at 200° C. for 3 minutes, and then pressed at 40 kg/cm² for 5 minutes under heating. This composite sheet was transferred to a press, and further pressed at 40 kg/cm² at an ordinary temperature for 5 minutes. The thickness of the fiber reinforced plastic sheet thus produced was 4 mm, and the glass fiber content was 40 wt. %.

Example 2

Five kinds of chopped strands ("FES-13-1252M", manufactured by Fuji Fiber Glass Co., Ltd.) different in the number of filaments were uniformly mixed to obtain a mixture composed of 50 wt. % of the strands having a number of filaments of 800, 30 wt. % of the strands having a number of filaments of 400, 10 wt. % of the strands having a number of filaments of 100, 5 wt. % of the strands having a number of filaments of 50, and 5 wt. % of the strands having a number of filaments of 10. A nonwoven fabric was prepared in the same manner as Example 1.

Instead of PP film 14, the same quantity of PP plant powder ("J 900P", manufactured by Mitsui Petrochemical Industries Co., Ltd.) was spread, and a fiber reinforced plastic sheet 4 mm in thickness was prepared in the same manner as Example 1.

Example 3

Figure 4:
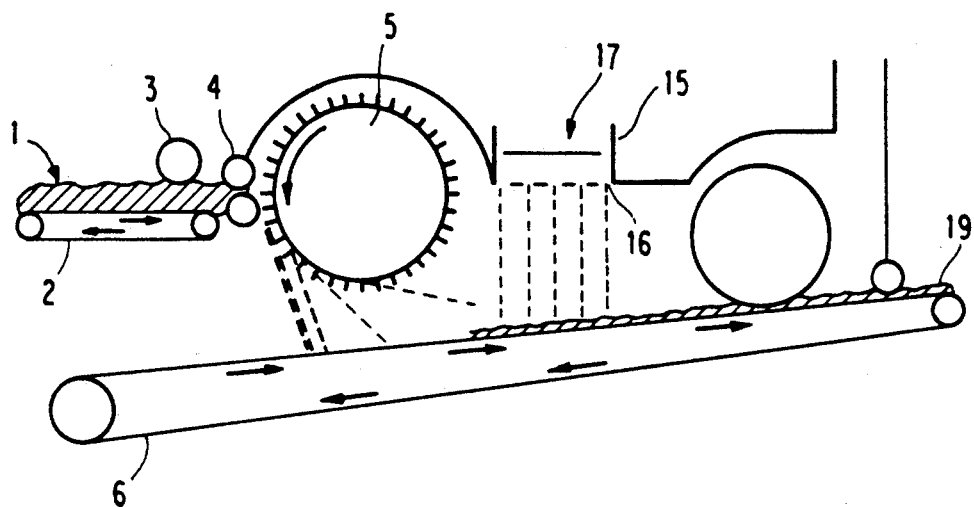
FIGS. 4, 5 and 6 each illustrate other apparatuses for producing a fiber nonwoven fabric used for a fiber reinforced plastic sheet of the invention.

A nonwoven fabric was prepared using the apparatus shown in FIG. 4. This apparatus was the same as employed in Example 1, except that a resin powder hopper 15 was provided after the spike drum 5. PP plant powder ("J 900P") 17 was spread on layering glass fibers through many holes 16 having a diameter of 1.5 mmφ. In order to secure uniform distribution, the hopper 15 was vibrated by a vibrator (not illustrated).

The nonwoven fabric containing PP powder was pressed by a hot press under heating and then by a cold press. The press conditions were the same as Example 1. The thickness of the fiber reinforced plastic sheet thus produced was 1 mm, and the glass fiber content was 40 wt. %.

Example 4

Figure 5:
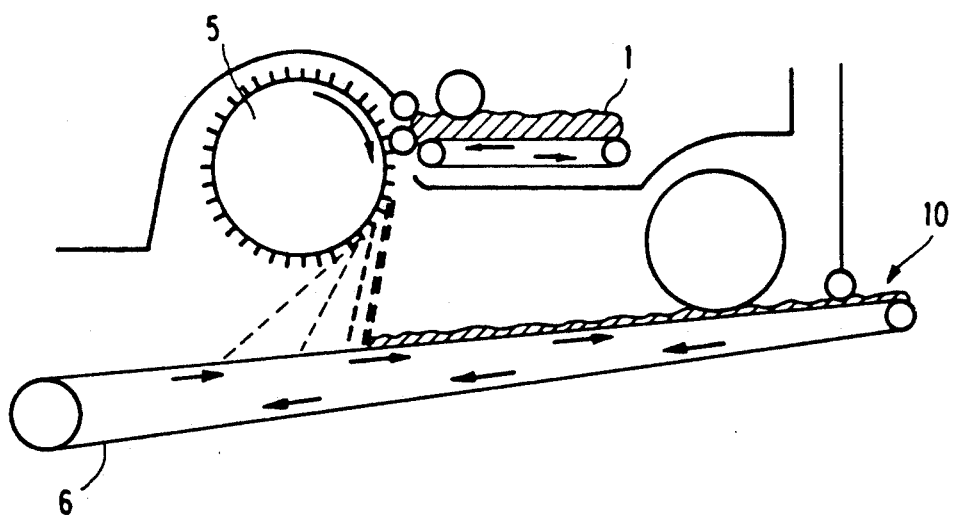

A nonwoven fabric was prepared using the apparatus shown in FIG. 5. This apparatus was the same as employed in Example 1, except that the feeding direction of glass fiber and rotating direction of the spike drum 5 were reversed. The layer structure of the nonwoven fabric was reversed, i.e., monofilaments were layered on the lower side and unopened strands were layered of the upper side.

Example 5

The same glass fiber mixture as employed in Example 1 was discharged through a nozzle 21 of a blower 20 having a rotary blade (1,000 rpm) together with air toward a bamboo SUNOKO conveyor 6 at an angle of about 45 degrees. The breadth of the nozzle 21 was almost the same as the bamboo SUNOKO. The glass fibers forming the nonwoven fabric were more opened than when put into the blower 20. The layer structure was similar to that shown in FIG. 1.

Comparative Example 1

Figure 6:
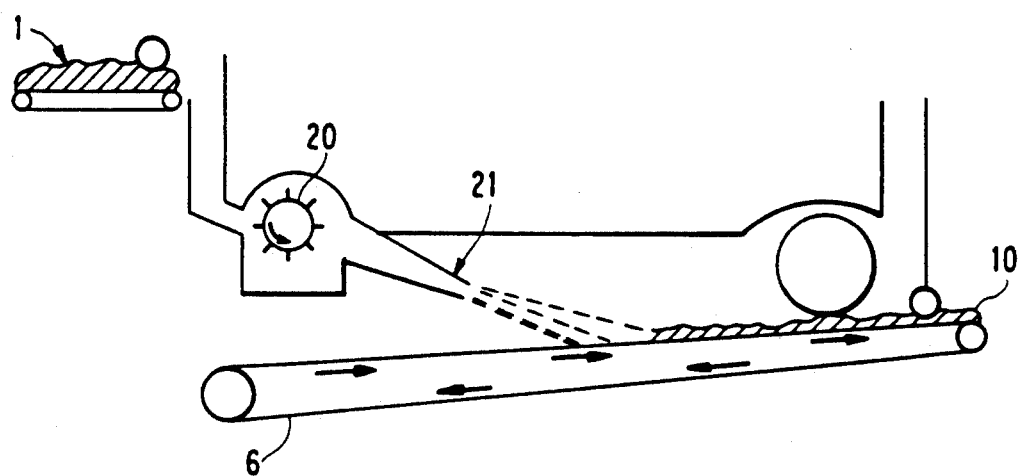

In the apparatus of FIG. 6, the angle of the nozzle 21 was set vertical to the SUNOKO belt of the conveyor 6, and a nonwoven fabric was produced in the same manner as Example 5. The nonwoven fabric had a random structure where monofilaments, unopened strands, and strands in intermediate opened states were mixed.

A baffle plate was provided after the nozzle 21 of the apparatus of FIG. 6, and a nonwoven fabric was produced in the same manner as Example 5. The glass fiber flow was disturbed by the baffle plate, and the nonwoven fabric had a random structure, and a gradient layer structure like that shown in FIG. 1 could not be obtained.

Subsequently, various properties of a fiber reinforced plastic sheet of the invention prepared in Example 6 were compared with conventional fiber reinforced plastic sheets prepared in Comparative Examples 2 to 6.

Example 6

Figure 8:
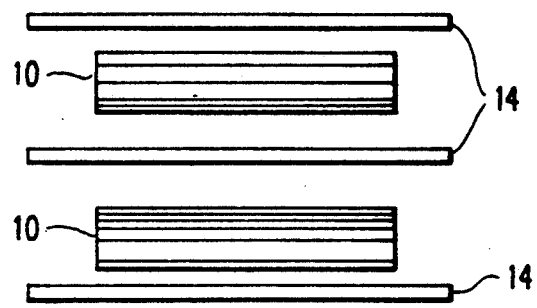
FIG. 8 is a schematic section illustrating a superposed state prior to pressing under heating to produce a fiber reinforced plastic sheet of the invention.

A nonwoven fabric 10 was prepared in the same manner as Example 1 wherein the traveling speed of the conveyor 6 was lowered to 50 cm/min. The areal weight of the nonwoven fabric was about 1,000 g/m². Two sheets of the nonwoven fabric 10 and three sheets of PP film 14 (MI=40, manufactured by Mitsui Petrochemical Industries Co., Ltd.) were superposed alternately as shown in FIG. 8, and a fiber reinforced plastic sheet 4 mm in thickness was prepared in the same manner as employed in Example 1.

Comparative Example 2

Two sheets of chopped strand mats ("CM 9005F", AS 900 g/m², manufactured by Asahi Fiber Glass Co., Ltd.), two sheets of surfacing mats ("3605E", 100 g/m², manufactured by the same company) and five sheets of PP film 14 were superposed in the order of PP film, surfacing mat, PP film, chopped strand mat, PP film, chopped strand mat, PP film, surfacing mat and PP film. The superposed matter was pressed by a hot press and then a cold press to form a fiber reinforced plastic sheet 4 mm in thickness. Respective mats contained an organic binder.

Comparative Example 3

Glass chops ("FES-13-0874G", Fuji Fiber Glass Co., Ltd.) 13 mm in fiber length containing a water-soluble sizing agent were mixed with PP pulverized powder ("J 900, MI=40, 100 mesh pass, Mitsui Petrochemical Industries Co., Ltd.) and a small amount of synthetic pulp ("SWP E620", Mitsui Petrochemical Industries Co., Ltd.) in water by a homomixer. The glass chops were opened to monofilaments to form an uniform mixture with PP powder. The mixture was made into a sheet by a papermaking method, dehydrated and dried. The sheet was pressed by a hot press and then a cold press to form a fiber reinforced plastic sheet.

Comparative Example 4

Glass chops ("FES-13-1252M") and PP powder ("J 900") were put in a Henschel mixer ("FM75J"), and mixed by the ZoSo stirring blade used at a peripheral speed of 40 m/min for 5 minutes. The glass chops were opened in pill form, and a cotton shape mixture was obtained wherein PP powder adhered to fibers. The mixture was made into a sheet, and pressed by a hot press and then a cold press to form a fiber reinforced plastic sheet.

Comparative Example 5

Glass chops ("FES-13-1252M") were lightly mixed with PP powder ("J900") by a ribbon blender while it was controlled so that the glass chops were not opened.

The mixture was made into a sheet, and a fiber reinforced plastic sheet was prepared in a similar manner.

Comparative Example 6

A commercial stampable sheet A was used as a comparative material which contained a continuous glass strand mat as a reinforcing material. The strand mat was formed by a needle-punching process.

Figure 7:
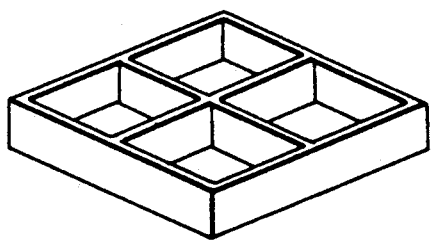
FIG. 7 is a perspective view of a molded article using a fiber reinforced plastic sheet of the invention.

As the strength of each fiber reinforced plastic sheet, tensile strength, bending strength, bending elastic modulus and Izod impact strength were compared. As the molding test, each sheet was cut in pieces of $4^t \times 130 \times 130$ mm, and each two pieces were heated at 210° C. The pieces were superposed, and placed in a mold having a shear edge structure. Then, they were molded by compression molding in the form shown in FIG. 7. The molded article had a size of $150 \times 150 \times 25$ mm, and its thickness was 3 mm. The temperature of the mold was 30° C., and the pressing time was 30 seconds. The molded article was evaluated in terms of the appearance by visual obsevation, the minimum pressure capable of molding into the form of FIG. 7 without lack of filling and the fiber filling ability into the rib portion. The glass fiber content of all fiber reinforced plastic sheets was made 40 wt. %.

The results were summarized in Table 1.

22 was heated at higher than about 100° C., and the outside was also heated by a far-infrared heater 23, so that the melted PP was not solidified prior to being pressed to the nonwoven fabric. The web of the nonwoven fabric 10 was traveled continuously from the left side in FIG. 9. Melted PP was bonded onto both sides of the nonwoven fabric during passing the pressure rolls 22 and cooled by the air blown from the air line 24. The fiber reinforced plastic sheet 25 thus produced (about 2.5 mm in thickness) contained PP impregnated from both sides of the glass fiber nonwoven fabric and handling was possible.

The sheet 25 was cut into pieces of about $30 \times 30$ cm, and the reverse sides of two sheets were faced to each other, as shown in FIG. 10. The pair of sheets was impregnated and degassed completely by the method similar to Example 1 to form a laminated sheet about 4 mm in thickness. A section of the laminated is schematically shown in FIG. 11. PP was impregnated over the sheet, and monofilaments 11 gathered on the outside and unopened strands 13 gathered at the central portion.

In the method of this example, since an expensive resin sheet was not used, the cost of the fiber reinforced plastic sheet could further be decreased.

The above fiber reinforced plastic sheet could be

TABLE 1

|  | Unit | Example 6 | Comparative Example 2 | 3 | 4 | 5 | 6 |
| --- | --- | --- | --- | --- | --- | --- | --- |
| Glass Fiber Length | mm | 13 | 50 | 13 | 13 | 13 | Continuous |
| Glass Content | wt. % | 40 | 40 | 40 | 40 | 40 | 40 |
| Tensile Strength | kgf/mm$^2$ | 9.0 | 8.0 | 9.0 | 8.0 | 7.0 | 9.0 |
| Bending Strength | kgf/mm$^2$ | 15.0 | 12.0 | 14.0 | 12.0 | 10.0 | 12.0 |
| Bending Elastic Modulus | kgf/mm$^2$ | 600 | 450 | 550 | 550 | 400 | 550 |
| Izod Impact Strength with Notch | kgf · cm/cm | 90 | 60 | 30 | 40 | 60 | 90 |
| Smoothness | — | A | B | A | C | C | B |
| Fiber Exposure *2 | — | A | A | B | D | D | C |
| Moldability (Fluidity) | — | B | C | D | D | B | B |
| Minimum Molding Pressure *3 | kgf/cm$^2$ | 70 | 100 | 200 | 160 | 70 | 70 |
| Filling Ability of Fibers into Rib | — | A | D | A | A | B | D |

*1 A ... Excellent, B ... Good, C ... Slightly Inferior, D ... Inferior
*2 Less exposure and projection of fibers is better
*3 Value against the projected area (150 × 150 mm) of molded article.

As shown in Table 1, the fiber reinforced plastic sheet of the invention is superior to every conventional fiber reinforced plastic sheet. In the sheet of the invention, expensive glass fiber mats were not used, different from Comparative Examples 2 and 6, and the dehydration process and the drying process were not necessary. Therefore, the sheet of the invention can be produced inexpensively.

Example 7

Figure 12:
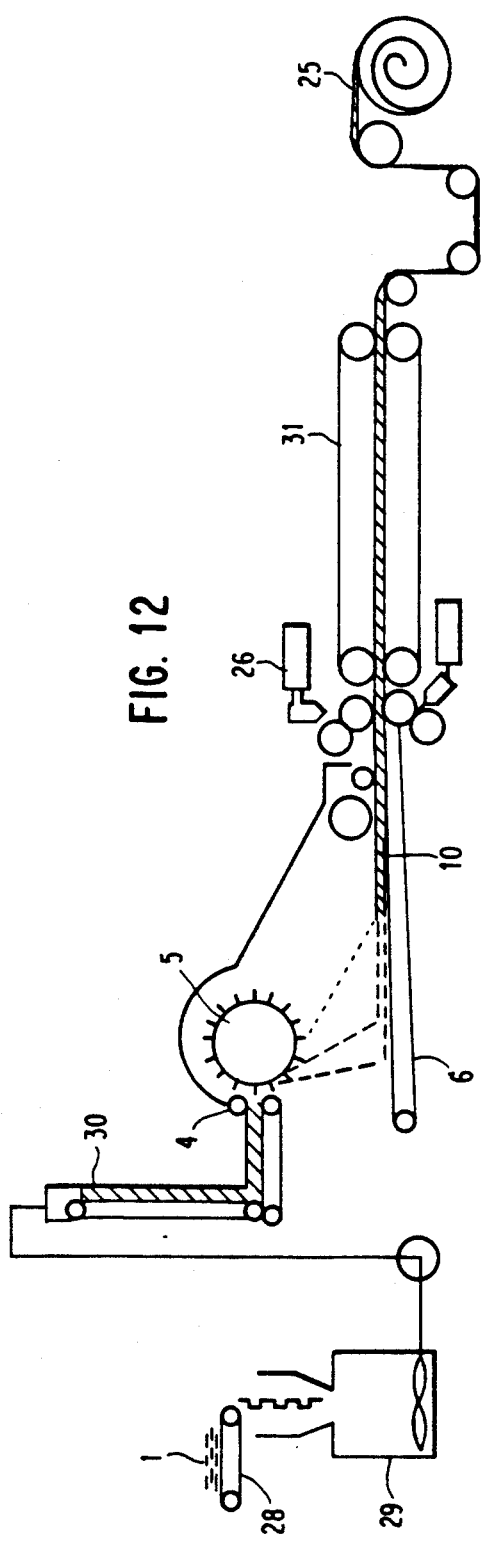
FIG. 12 is a schematic side view of an apparatus producing a fiber reinforced plastic sheet of the invention.

A glass fiber nonwoven fabric about 1,000 g/m² in areal weight was prepared in the same manner as Example 6. The structure was similar to that shown in FIG. 1. Using an apparatus as shown in FIG. 9, sheet-shaped melted PP 14 was bonded onto both sides of the nonwoven fabric 10 by pressing. The PP was prepared by modifying PP ("J170", Nippon Petrochemicals Co., Ltd.) and had a MI of 60. The resin thickness of both layers was about 0.8 mm. The PP 14 was extruded in sheet shape from the T die 27 of the extruders 26 disposed on the upper and lower sides of the U nonwoven fabric 10 onto each pressure roll 22. Each pressure roll produced continuously, for example, using the apparatus shown in FIGS. 12 and 13.

Figure 13:
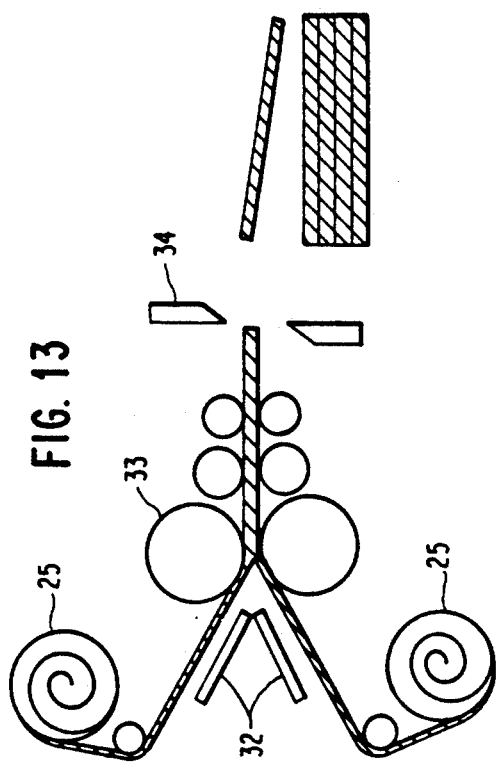
FIG. 13 is a schematic side view of a apparatus joining two sheets of the above fiber reinforced plastic sheet facing each other.

In this apparatus, unopened glass fibers 1 were conveyed by a conveyor 28, and opened by an opener 29. The opened fibers were pneumatically transported to a feeder 30, and fed to a spike drum rotating quantitatively 5 through a feeding roll 4. The glass fibers were arranged in a gradient layer structure similar to Example 1 to form a glass fiber nonwoven fabric 10, and melted PP was bonded to both sides of the nonwoven fabric. Then, it was pressed by a double belt press 31, and the web of the fiber reinforced plastic sheet 25 so produced was wound around a take-up roll. The front portion of the double belt press had heaters, and the resin was further impregnated by heating higher than the melting point of the resin, while, the rear portion had coolers, and the resin was solidified by cooling. Subsequently, as shown in FIG. 13, two rolls of the fiber reinforced plastic sheet web were faced and delivered. The facing sides were heated to melt the resin by far-infrared heaters 32, and bonded by passing a pair of pressure rolls 33. The bonded sheet was cooled during traveling, and cut into a prescribed length by a cutter 34.

Example 8

A one direction reinforced sheet 35 composed of continuous glass fiber roving arranged in one direction impregnated with PP was prepared according to the method described in the example of Japanese Patent KOKAI No. 59-14924. The thickness of the sheet was about 1 mm, and the glass fiber content was about 40 wt. %.

On the other hand, a glass fiber nonwoven fabric having an areal weight of about 500 g/m² was prepared and PP was impregnated therein, by the same method as Example 1, to produce a fiber reinforced plastic sheet 25 about 1 mm in thickness having a gradient layer structure.

Figure 14:
FIG. 14 is a schematic section of a laminated sheet containing two fiber reinforced plastic sheets of the invention.

Two sheets of the above fiber reinforced plastic sheet 25 were superposed so that the unopened strand sides faced each other, and one sheet of the one direction reinforced sheet was superposed on both outsides, as shown in FIG. 14. The superposed material was pressed by a hot press at 40 kg/cm² at 200° C. for 5 minutes, and then by a cold press at 40 kg/cm² for 5 minutes. The thickness of the laminated sheet was about 4 mm, and the glass fiber content was about 40 wt. %. The laminated sheet had a tensile strength of 25 kg/mm², a bending strength of 30 kgf/mm² and a bending elastic modulus of 1,100 kgf/mm², in the reinforced direction.

As shown in this example, molded articles having a high strength in one direction and good fluidity during processing can be produced by combining the fiber reinforced plastic sheet of the invention with the one direction reinforced sheet, and they are suitable for a reinforcing member of a bumper for a motor car or the like.

Example 4

Chopped strands ("FES-13-1252M", Fuji Fiber Glass Co., Ltd.) were put uniformly in a cotton opener ("KF-3", Chuo Menzai Seisakusho), and the strands were partly opened. The cylinder diameter of the opener was 466 mmφ, and the rotation speed was 600 rpm. The cylinder surface had many projections call spike needles. The strands were passed through the cotton opener twice, to obtain a glass fiber mixture composed of about 5 wt. % of monofilaments, about 50 wt. % of unopened strands, and the remainder being in intermediate opened states.

The glass fiber mixture was treated in the same manner as in Example 1, to produce a glass fiber nonwoven fabric shown in FIG. 1.

We claim:

1. A fiber reinforced plastic sheet which comprises discontinuous reinforcing glass fibers which have a length of 3 to 50 mm, differ in the number of filaments, and of which 1 to 70% is monofilament, dispersed in a thermoplastic resin selected from the group consisting of polyethylene resin, polypropylene resin, ethylene-propylene copolymer resin, polyethylene terephthalate resin, polystyrene resin, polycarbonate resin, polyamide resin, polyacetal resin and methacrylic resin in a ratio of the resin to the fiber being 100 parts by weight of the resin to 5 to 200 parts by weight of the fiber, said fibers being arranged in parallel to the surface of the sheet and being arranged in a gradient layer structure which continuously varies form a layer of the fibers having a greater number of lighter filaments to a layer of the fibers having a lesser number of heavier filaments, said lesser number of heavier filaments being as compared to said greater number of lighter filaments, wherein said fiber reinforced plastic sheet has a thickness of 1 to 10 mm and a width, wherein in the thickness direction at a first side of said fiber reinforced plastic sheet the lesser number of said heavier filaments are present and at the side of said fiber reinforced plastic sheet opposite said first side the greater number of said lighter filaments are present, and wherein in the width direction of said fiber reinforced plastic sheet, the layer structure at any plane thereacross is the same.

2. A fiber reinforced plastic sheet as in claim 1, wherein a second fiber reinforced plastic sheet as in claim 1 is joined therewith, such that the layers of the fibers having the lesser number of heavier filaments are disposed on the outside surfaces of the joined sheets in the width direction, and the layers of the fibers having a greater number of lighter filaments as compared to the fibers disposed on the outside surfaces of the joined sheet are disposed at the center of the joined sheet.

3. The fiber reinforced plastic sheet of claim 1, wherein said thermoplastic resin is polypropylene resin.

4. The fiber reinforced plastic sheet of claim 1, wherein monofilament of said discontinuous reinforcing glass fibers is 5 to 50 wt. %.

5. The fiber reinforced plastic sheet of claim 1, which has a bending strength of at least 15 kgf/mm².

* * * * *